United States Patent
Bae et al.

(10) Patent No.: US 12,487,707 B1
(45) Date of Patent: Dec. 2, 2025

(54) TOUCH SIGNAL DETECTION APPARATUS FOR CALIBRATING QUANTIZATION ERROR OF TOUCH SIGNAL

(71) Applicant: G2touch Co., Ltd., Seongnam-si (KR)

(72) Inventors: Seong-Ho Bae, Seongnam-si (KR); Hong-Yun Kim, Seongnam-si (KR); Hyun-Woo Shim, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 19/053,369

(22) Filed: Feb. 13, 2025

(30) Foreign Application Priority Data

May 31, 2024 (KR) .......................... 10-2024-0071236

(51) Int. Cl.
*G06F 3/041* (2006.01)
(52) U.S. Cl.
CPC .................................. *G06F 3/0418* (2013.01)
(58) Field of Classification Search
CPC ..................................................... G06F 3/0418
See application file for complete search history.

(56) References Cited

U.S. PATENT DOCUMENTS

| | | | |
|---|---|---|---|
| 6,977,646 B1 * | 12/2005 | Hauck ................. | G06F 3/04186 345/173 |
| 7,639,238 B2 * | 12/2009 | Hauck ................. | G06F 3/04186 345/173 |
| 10,423,277 B2 * | 9/2019 | Hosur ................. | G06F 3/04182 |
| 2006/0202969 A1 * | 9/2006 | Hauck ................. | G06F 3/04186 345/173 |
| 2018/0188888 A1 * | 7/2018 | Hosur ................. | G06F 3/04182 |

FOREIGN PATENT DOCUMENTS

| | | | | |
|---|---|---|---|---|
| EP | 1886211 B1 * | 11/2011 | ......... | G06F 3/04182 |
| WO | WO-2015107091 A1 * | 7/2015 | ............ | H03M 3/358 |

OTHER PUBLICATIONS

Machine translation of WO-2015107091-A1 (Year: 2025).*

* cited by examiner

*Primary Examiner* — Michael Pervan
(74) *Attorney, Agent, or Firm* — NKL Law; Jae Youn Kim

(57) ABSTRACT

Provided is a touch signal detection apparatus configured to calibrate a quantization error of a touch signal including a first digital-to-analog converter (DAC) configured to provide a first calibration voltage, a first calibration amplifier configured to amplify and output a difference between a touch signal generated by detecting touch input and the first calibration voltage using gain greater than 1, a second DAC configured to provide a second calibration voltage, a second calibration amplifier configured to sample and hold a difference between output of the first calibration amplifier and the second calibration voltage, and an analog-to-digital converter (ADC) configured to convert output of the second calibration amplifier into a digital code, wherein bit resolutions of the first DAC and the second DAC are the same.

11 Claims, 9 Drawing Sheets

TOUCH SIGNAL DETECTION APPARATUS FOR CALIBRATING QUANTIZATION ERROR OF TOUCH SIGNAL

BACKGROUND OF THE INVENTION

Field of the Invention

The present invention relates to a touch signal detection apparatus, and more particularly to an error calibration technology of the touch signal detection apparatus that detects a touch signal with high gain.

Description of the Related Art

FIG. 1 is a diagram schematically illustrating a touch panel that detects touch input of a user and outputs a corresponding touch signal. As illustrated in FIG. 1, when the user touches the touch panel using an object such as a finger, a capacitor having capacitance is formed between the object and a sensor forming the touch panel, and the capacitance is detected to determine whether touch has occurred.

As illustrated in the figure, even for sensors arranged in the same column, signal deviation occurs due to differences in lengths of wires connecting a touch detection circuit (touch sensing IC) that detects touch and the sensors, and even for sensors arranged in the same row, deviation occurs due to differences in lengths of wires.

FIG. 2 is a diagram for describing the above-described deviation calibration. Four blue signals A, B, C, and D are analog signals generated by detecting touch at four different locations. When these signals are digitized without calibration, four green quantized signals A, B, C, and D are generated, respectively. A reference line on which the signals swing is converted to correspond to voltages at which the original analog signals swing.

Calibration is necessary for swinging based on a code 512 such as a red signal so that the same analysis criterion as touch detection therefor is applied to detect touch and maximum amplitude may swing without clipping.

SUMMARY OF THE INVENTION

To improve sensitivity of touch detection, an input signal is amplified by an amplifier having high gain in some cases. However, a quantization error occurring in a process of quantizing a touch signal is also amplified by the gain. That is, when a system having high gain is used during calibration, calibration on a per-1-LSB basis is not performed, and thus it is necessary to perform calibration on a per-1-LSB basis. Furthermore, in such a case, it is necessary to minimize an increase in die area for forming the system.

The technical problems to be solved by the present invention are not limited to the technical problems mentioned above, and other technical problems not mentioned herein may be clearly understood by a person having ordinary skill in the art from the description of the present invention.

In accordance with the present invention, the above and other objects can be accomplished by the provision of a touch signal detection apparatus configured to calibrate a quantization error of a touch signal, the touch signal detection apparatus including a first digital-to-analog converter (DAC) configured to provide a first calibration voltage, a first calibration amplifier configured to amplify and output a difference between a touch signal generated by detecting touch input and the first calibration voltage using gain greater than 1, a second DAC configured to provide a second calibration voltage, a second calibration amplifier configured to sample and hold a difference between output of the first calibration amplifier and the second calibration voltage, and an analog-to-digital converter (ADC) configured to convert output of the second calibration amplifier into a digital code, wherein bit resolutions of the first DAC and the second DAC are the same.

An input/output relationship of the touch signal detection apparatus may correspond to a formula, $V_{OUT}=A(V_S-V_{DAC1})-V_{DAC2}$, where $V_{OUT}$ denotes a sensing signal, $V_S$ denotes a touch signal, $V_{DAC1}$ denotes a first calibration voltage, $V_{DAC2}$ denotes a second calibration voltage, and A denotes a first calibration amplifier.

The touch signal detection apparatus may further include an operation unit configured to provide a first calibration code corresponding to the first calibration voltage to the first DAC, and provide a second calibration code corresponding to the second calibration voltage to the second DAC.

The operation unit of the touch signal detection apparatus may provide, as the first calibration code, a quotient of a value obtained by dividing a difference between a target reference line and a reference line of a signal quantized without calibrating the touch signal by a product of a ratio of ADC bit resolution to the bit resolutions of the first DAC and the second DAC and gain of the first calibration amplifier, and provide a remainder of the divided value as the second calibration code.

The operation unit may calculate a formula $$\frac{\text{Target} - \text{Signal}_{w/o\_cal}}{A \times \left(\frac{Res_{ADC}}{Res_{DAC}}\right)} = n + \frac{\alpha}{A \times \left(\frac{Res_{ADC}}{Res_{DAC}}\right)},$$

and provide n and α as the first calibration code and the second calibration code, respectively, where Target denotes a target reference line, $\text{Signal}_{w/o\_cal}$ denotes a reference line of a signal quantized without calibrating the touch signal, A denotes gain of the first amplifier, $Res_{ADC}$ denotes bit resolution of the ADC, $Res_{DAC}$ denotes bit resolution of a DAC, n denotes a quotient, and α denotes a remainder.

The operation unit may provide, as the first calibration code, a quotient of a value obtained by dividing a difference between a target reference line and a reference line of a signal quantized by amplifying the touch signal using gain 1 by a ratio of bit resolution of the ADC to the bit resolutions of the first DAC and the second DAC, and provide a remainder of the divided value as the second calibration code.

The operation unit may calculate a formula $$\frac{\text{Target} - \text{Signal}}{1 \times \left(\frac{Res_{ADC}}{Res_{DAC}}\right)} = n + \frac{\alpha}{1 \times \left(\frac{Res_{ADC}}{Res_{DAC}}\right)},$$

and provide n and α as the first calibration code and the second calibration code, respectively, where Target denotes a target reference line, Signal denotes a reference line of a signal quantized by amplifying the touch signal using gain 1, $Res_{ADC}$ denotes bit resolution of an ADC, $Res_{DAC}$ denotes the bit resolutions of the first and second DACs, n denotes a quotient, and α denotes a remainder.

The operation unit may provide, as the first calibration code, a quotient of a value obtained by dividing a difference between a target reference line for an intermediate signal formed by providing the first calibration code and the second calibration code and a reference line of the intermediate signal by a product of a ratio of the bit resolution of the ADC to the bit resolutions of the first DAC and the second DAC and gain of the first calibration amplifier to the first DAC, and provide a remainder of the divided value to the second DAC as the second calibration code.

The operation unit may calculate a formula $$\frac{\text{Target} - \text{Signal}_m}{A \times \left(\frac{\text{Res}_{ADC}}{\text{Res}_{DAC}}\right)} = m + \frac{\beta}{A \times \left(\frac{\text{Res}_{ADC}}{\text{Res}_{DAC}}\right)},$$

and provide m and β as a third calibration code of the first DAC and a fourth calibration code of the second DAC, respectively, where Target denotes a target reference line, $\text{Signal}_m$ denotes a reference line at which an intermediate signal swings, $\text{Res}_{ADC}$ denotes the bit resolution of the ADC, $\text{Res}_{DAC}$ denotes the bit resolutions of the first and second DACs, A denotes gain of the first amplifier, m denotes a quotient, and β denotes a remainder.

Gain of the second calibration amplifier may be 1.

Bit resolution of the ADC may be greater than the bit resolution of the first DAC and the bit resolution of the second DAC.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
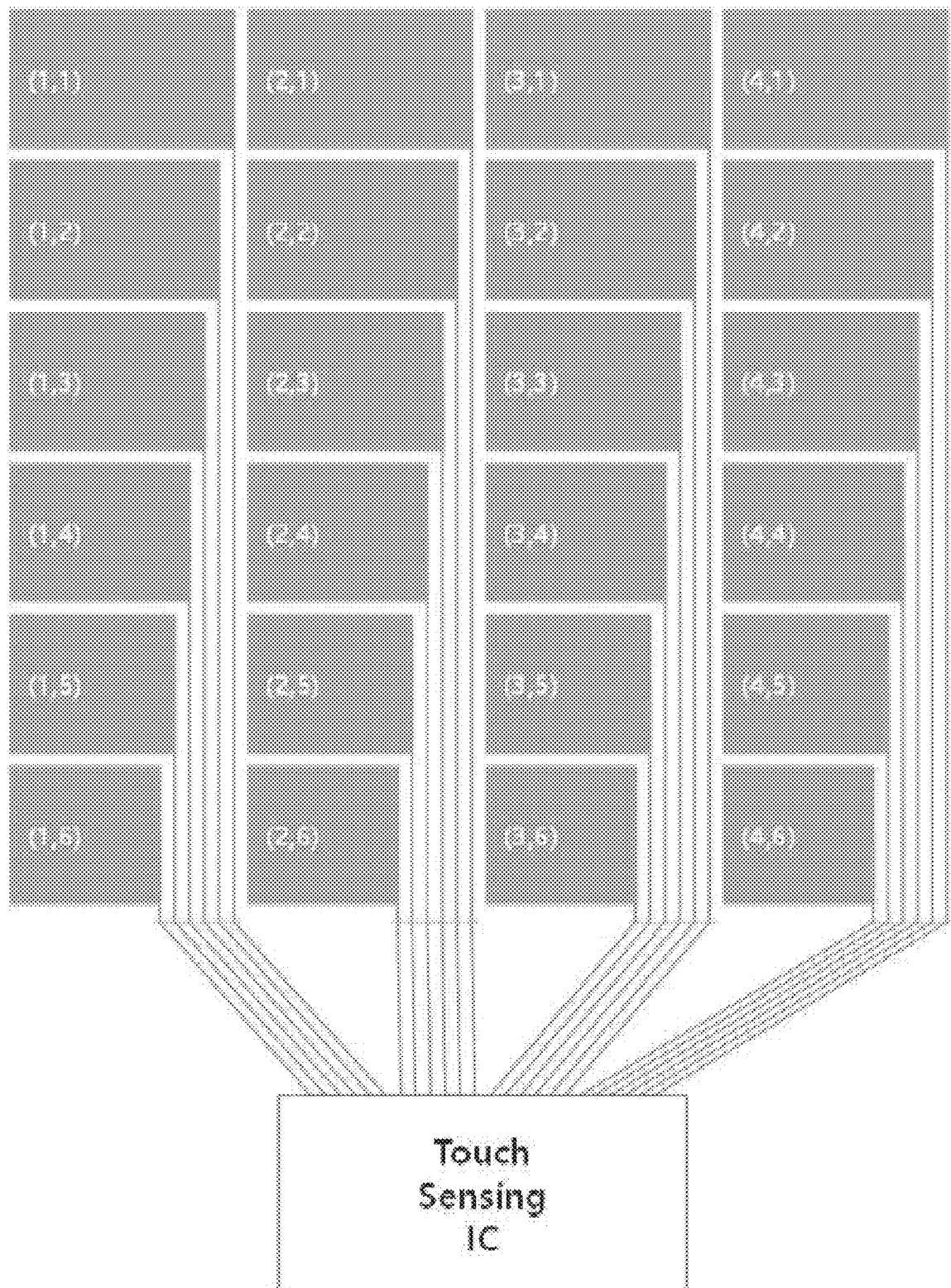
FIG. 1 is a diagram schematically illustrating a touch panel that detects touch input of a user and outputs a corresponding touch signal.
Figure 2:
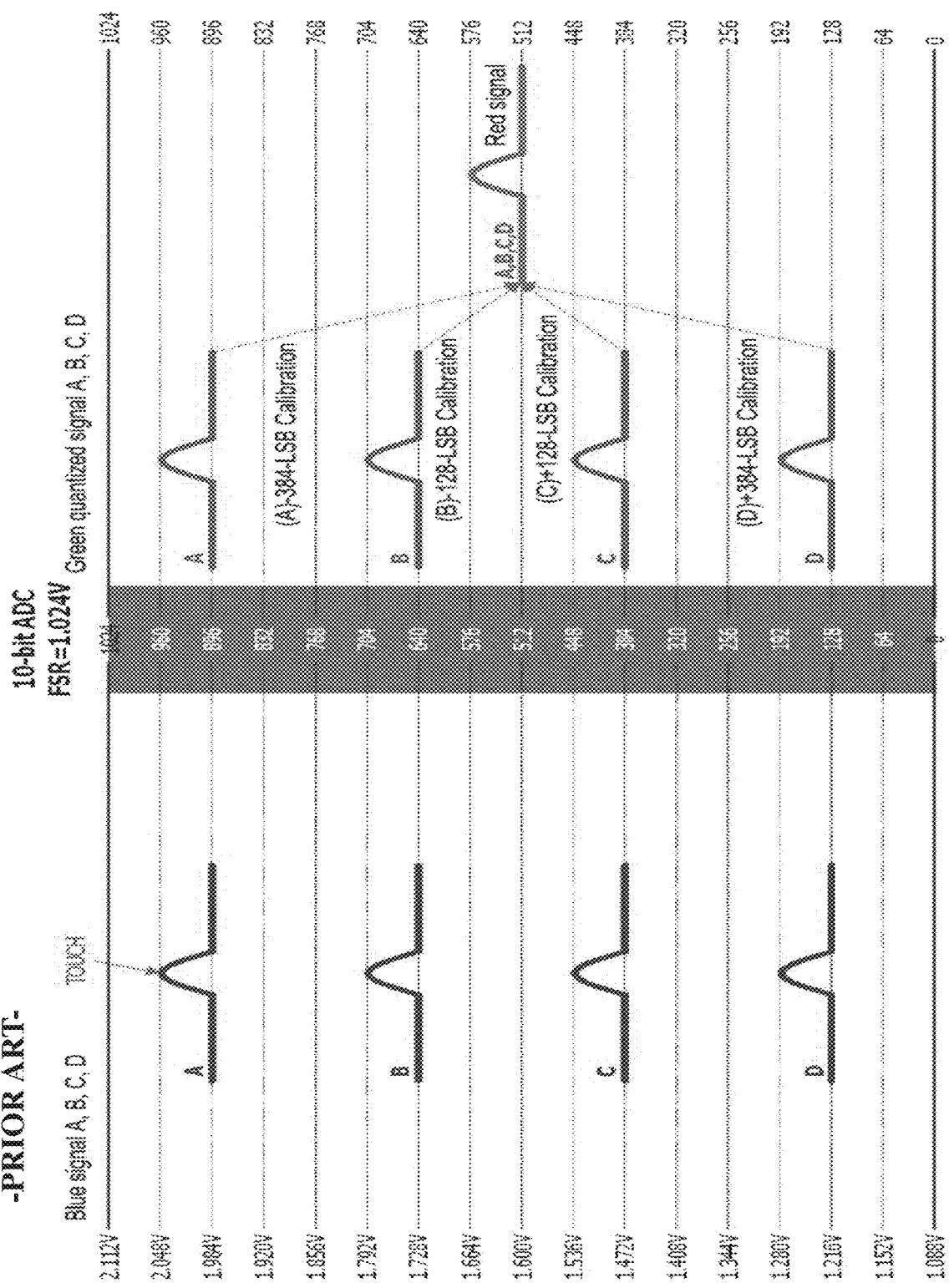
FIG. 2 is a diagram for describing deviation calibration.

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately conceptually define a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

Figure 3:
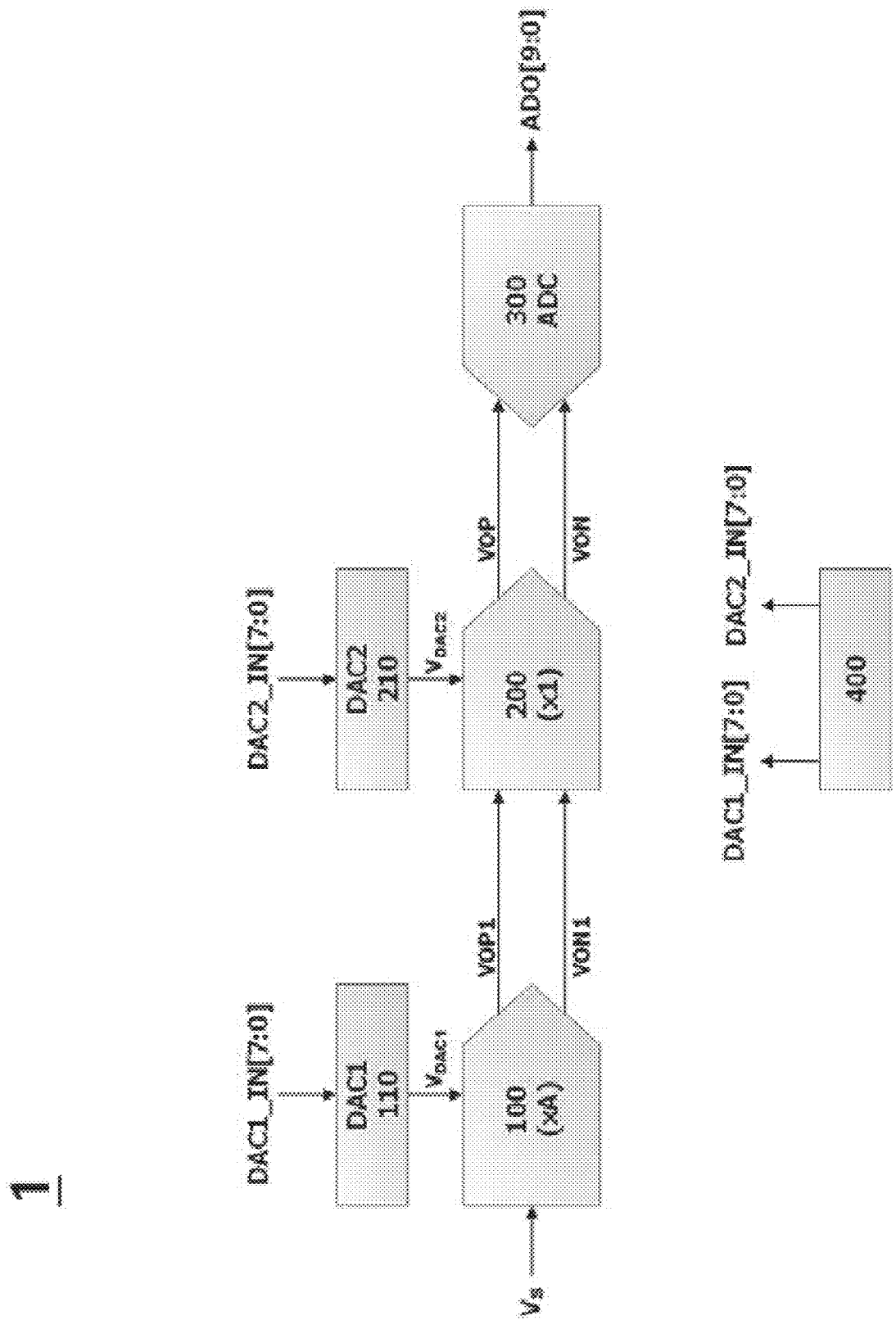
FIG. 3 is a schematic diagram illustrating a touch signal detection circuit according to the present embodiment.

FIG. 3 is a schematic diagram illustrating a touch signal detection circuit 1 according to the present embodiment. Referring to FIG. 3, the present embodiment is a touch signal detection apparatus for calibrating a touch signal with high accuracy, and the touch signal detection apparatus 1 includes a first DAC (digital-to-analog converter) 110 that provides a first calibration voltage VDAC1, a first calibration amplifier 100 that amplifies a difference between a touch signal $V_S$ generated by detecting a touch input and the first calibration voltage VDAC1 using gain A greater than 1 and outputs a result, a second DAC 210 that provides a second calibration voltage $V_{DAC2}$, a sample-hold amplifier 200 that samples and holds a difference between output of the first calibration amplifier 100 and the second calibration voltage, and an ADC (analog-to-digital converter) 300 that converts output of the sample-hold amplifier 200 into digital code.

An input/output relationship of the touch signal detection apparatus 1 illustrated in FIG. 3 is as shown in the following formula 1.

$$V_{OUT}=VOP-VON=A(V_S-V_{DAC1})-V_{DAC2} \quad \text{[Formula 1]}$$

($V_{OUT}$: sensing signal, $V_S$: touch signal, $V_{DAC1}$: first calibration voltage, $V_{DAC2}$: second calibration voltage, A: first calibration amplifier gain)

In the illustrated embodiment, the first DAC 110 receives a first calibration code DAC1_IN from an operation unit 400 and provides the first calibration voltage $V_{DAC1}$, and the second DAC 210 receives a second calibration code DAC2_IN from the operation unit 400 and outputs the second calibration voltage $V_{DAC2}$.

An FSR (full scale range) of the first DAC 110 corresponds to an FSR of the ADC 300, and the first DAC 110 has a resolution of 8 bits. Therefore, a change in analog voltage corresponding to 1-bit change of LSB of the first calibration code DAC1_IN provided to the first DAC 110 corresponds to four times a change in analog voltage corresponding to 1-bit change of LSB of the ADC 300. In addition, the FSR of the second DAC 210 corresponds to ¼ of the FSR of the ADC 300, and the first DAC 110 has a resolution of 8 bits. Therefore, a change in analog voltage corresponding to 1-bit change of LSB of the second DAC 210 corresponds to a change in analog voltage corresponding to 1-bit change of LSB of the ADC 300.

In addition, when LSB of the first calibration code DAC1_IN is changed by 1 bit, $\Delta V_{OUT}$, which is change of output $V_{OUT}$, is expressed as in (1) of Formula 2 below. When LSB of the second calibration code DAC2_IN is changed by 1 bit, $\Delta V_{OUT}$, which is change of output $V_{OUT}$, is expressed as in (2) of Formula 2 below.

[Formula 2]

$$\Delta V_{OUT}=A \times V_{DAC1\_LSB} \quad (1)$$

$$\Delta V_{OUT}=V_{DAC2\_LSB} \quad (2)$$

In other words, wide-range calibration is possible using the first calibration code DAC1_IN provided to the first DAC, and precise calibration in units of 1 LSB is possible using the second calibration code DAC2_IN provided to the second DAC.

Hereinafter, it is assumed that the FSR of the first DAC 110 and the ADC 300 is 1.024 V. The resolution of the ADC 300 is 10 bits, and the bit resolutions of the first DAC 110 and the second DAC 210 are 8 bits, which are the same. Therefore, when the LSB of the first calibration code DAC1_IN provided to the first DAC 110 in the equation (1) of Formula 2 is changed by 1 bit, calibration voltage change $V_{DAC1\_LSB}$ of the first DAC 110 becomes 4 mV.

The FSR of the second DAC 210 corresponds to ¼ of the FSR of the ADC 300 and the bit resolution is 8 bits. Therefore, when the LSB of the second calibration code DAC2_IN provided to the second DAC 210 in the equation (2) of Formula 2 is changed by 1 bit, the calibration voltage change $V_{DAC2\_LSB}$ of the second DAC 210 becomes 1 mV.

In a first embodiment described below, the gain A of the first calibration amplifier 100 is set to 4, and the gain of the second calibration amplifier 200 is set to 1.

Figure 4:
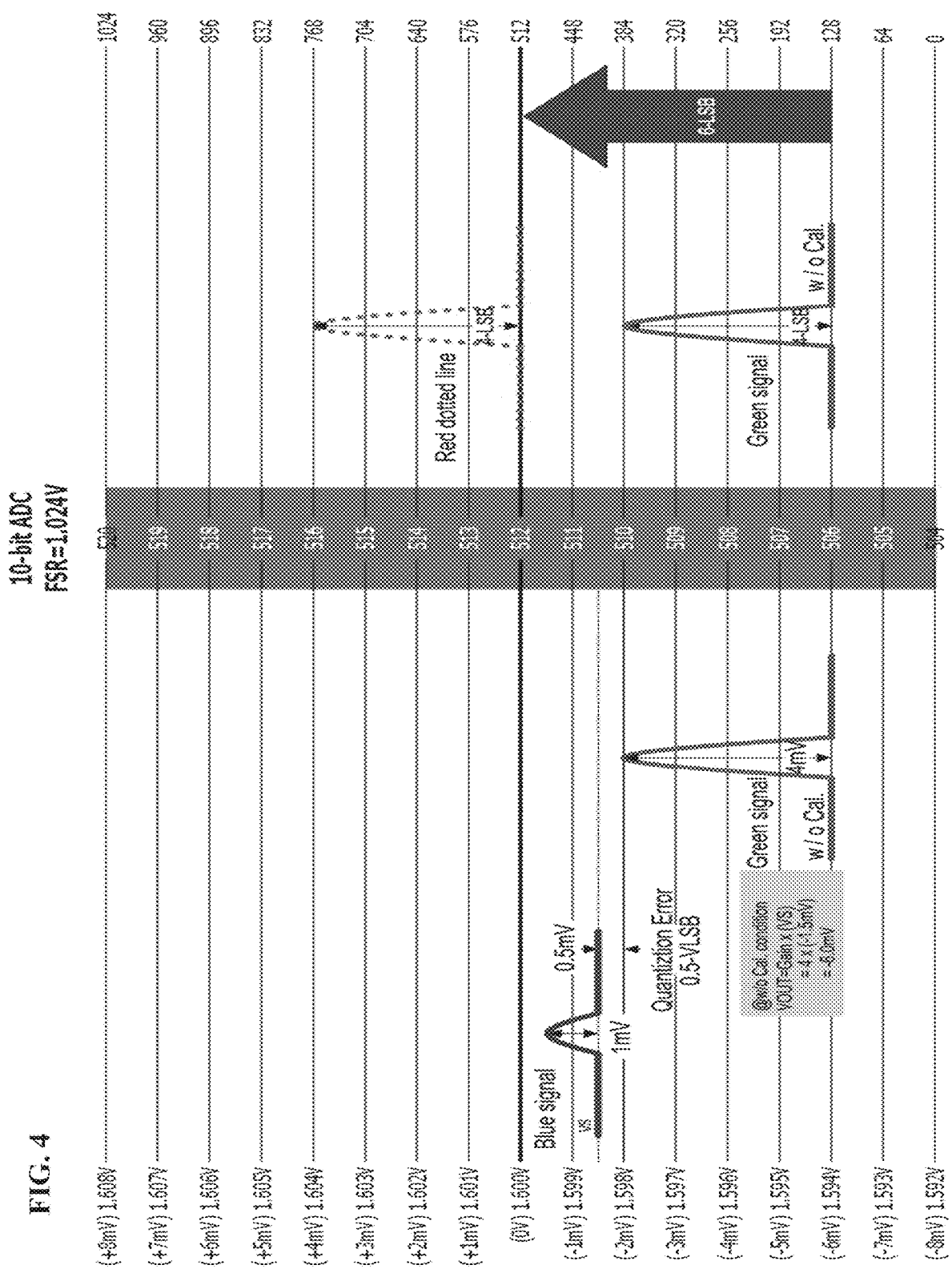
FIG. 4 is a diagram illustrating a touch signal, a green touch signal amplified using gain greater than 1 but not calibrated, and a calibration target of a red dotted line.
Figure 5:
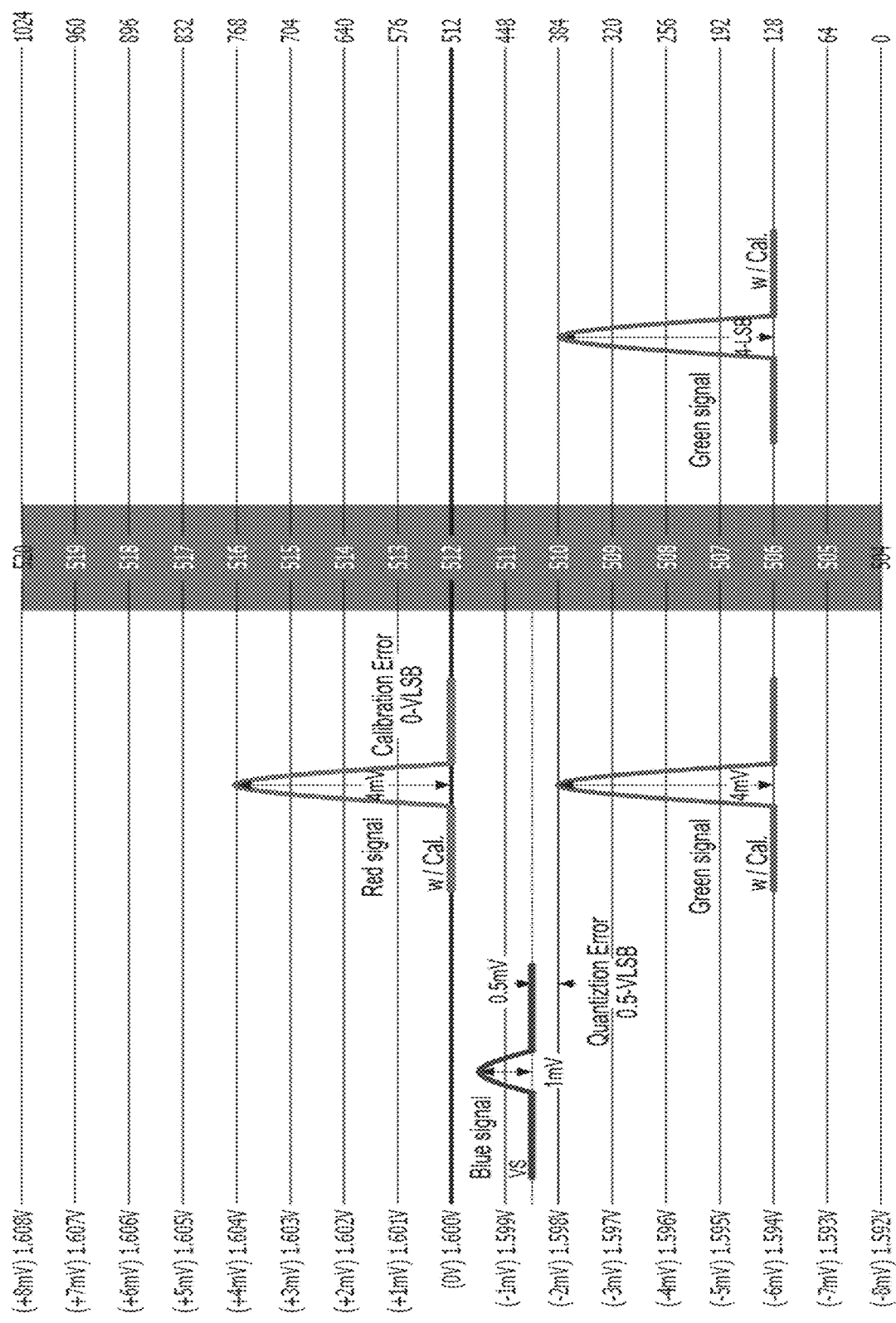
FIG. 5 is a diagram illustrating a process of performing calibration using a touch signal and an uncalibrated touch signal.
Figure 6:
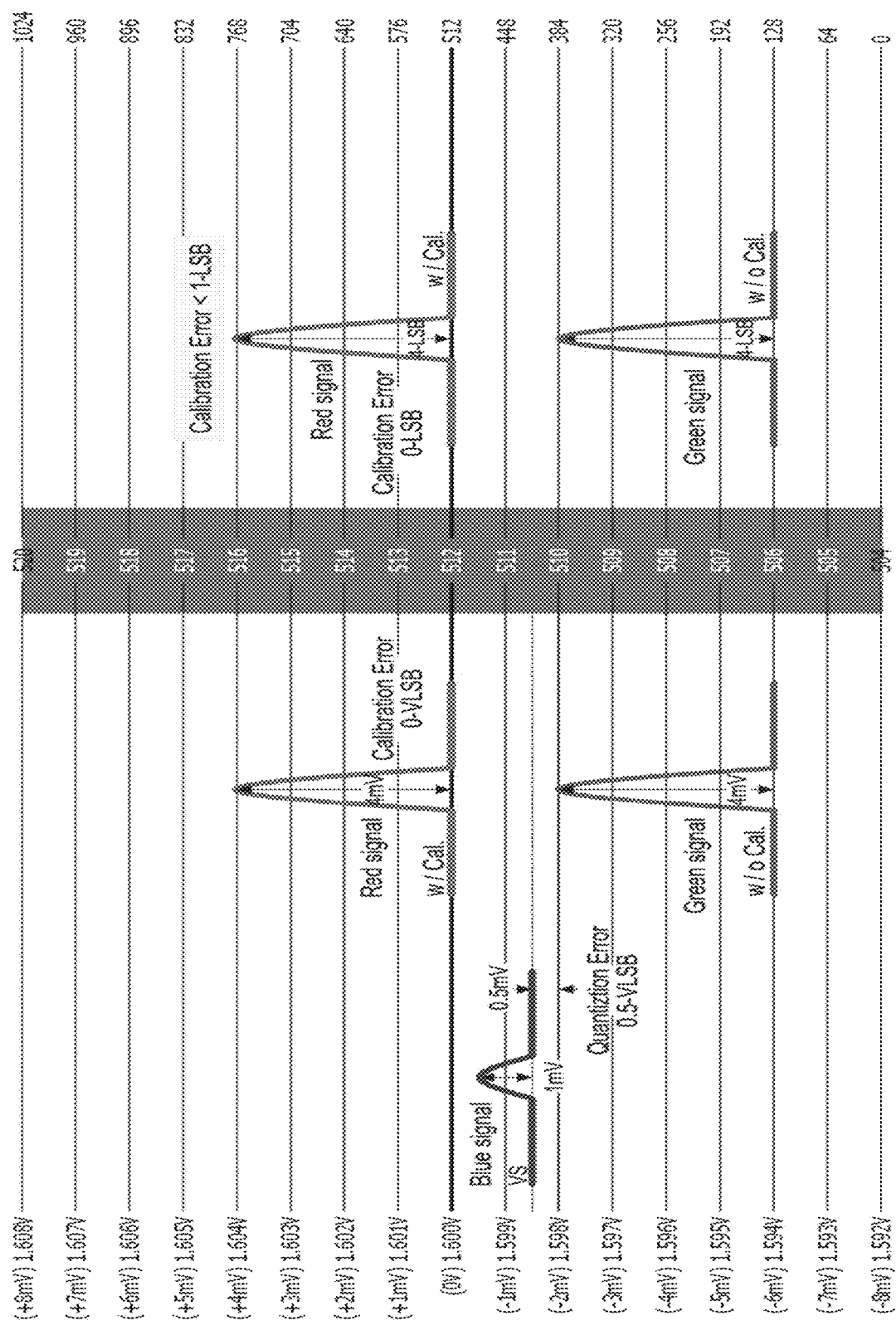
FIG. 6 is a diagram illustrating a touch signal that is amplified using gain greater than 1 and calibrated.

FIGS. 4 to 6 are drawings schematically describing a process of removing a calibration error according to the present embodiment. FIG. 4 is a diagram illustrating a blue touch signal, a green touch signal that has been amplified using gain greater than 1 but has not been calibrated, and a red dotted line indicating a calibration target. The green signal on the left is a sensing voltage input to the ADC, and the green signal on the right represents an ADC output signal. Referring to FIGS. 3 to 4, a user provides touch input by touching each sensor of a touch panel P using an object such as a finger. A touch signal $V_S$ corresponding to the touch input is different depending on the location where the user provides the touch input. In the illustrated example, a reference line is approximately −1.5 mV, and the magnitude of the touch signal is 1 mV. However, since a difference of 1 LSB of in a digital code represents an analog voltage difference of $1.024\ V/2^{10} = 1$ mV, when the touch signal $V_S$ is quantized, 0.5 mV is not accurately quantized, forming a quantization error.

When the touch signal $V_S$ is provided to the first calibration amplifier 100, if the touch signal $V_S$ is amplified with the gain of the first calibration amplifier 100 without calibration, the touch signal $V_S$ is amplified from a touch signal size of 1 mV to a touch signal of 4 mV, which is four times the gain, as indicated by a green line on the left, and swings with a reference line of −6 mV obtained by multiplying the reference line of −1.5 mV by the gain 4. When this is digitized, it can be seen that the reference line of the touch signal is converted into a digital code 506 corresponding to −6 mV.

However, in order to process touch signals formed in various areas of the touch panel using the same reference and ensure swings of the same amplitude up and down, it is necessary to convert the reference line into a digital code 512 corresponding to 0 V. The operation unit 400 calculates Formula 3 below to form the first calibration code DAC1_IN to be provided to the first DAC 110 and the second calibration code DAC2_IN to be provided to the second DAC 210.

$$\frac{\text{Target} - \text{Signal}_{w/o\_cal}}{A \times \left(\frac{Res_{ADC}}{Res_{DAC}}\right)} = \frac{512 - 506}{4 \times 2^2} = \frac{6}{16} = n + \frac{\alpha}{16} \qquad [\text{Formula 3}]$$

In Formula 3, Target denotes a code value corresponding to a reference line of a calibrated signal, and $\text{Signal}_{w/o\_cal}$ denotes a code value corresponding to a reference line of an uncalibrated signal. A denotes a gain value of the first calibration amplifier 100. $Res_{ADC}$ denotes a bit resolution of the ADC. For a 10-bit ADC, the bit resolution $Res_{ADC} = 2^{10} = 1024$. $Res_{DAC}$ denotes a bit resolution of the DAC. For 1 8-bit DAC, the bit resolution $Res_{DAC} = 2^8 = 256$. n denotes a quotient of a calculation result (n: integer), and α denotes a remainder. When Formula 1 is calculated according to the example illustrated in FIG. 4, n=0 and α=6 LSB.

FIG. 5 is a diagram illustrating a process of performing calibration using a touch signal and an uncalibrated touch signal. Referring to FIGS. 3 to 5, the operation unit 400 generates a code corresponding to the quotient n of the calculation result and provides the code to the first DAC 110 as the first calibration code DAC1_IN. In addition, the operation unit 400 generates code corresponding to the remainder a of the calculation result and provides the code to the second DAC 210 as the second calibration code DAC2_IN.

The first DAC 110 receives the first calibration code DAC1_IN, and outputs the corresponding first calibration voltage $V_{DAC1}$. In this instance, the first calibration voltage $V_{DAC1}$ is 0 mV corresponding to 0 LSB, which is a quotient (n) value. In addition, the second DAC 210 receives the second calibration code DAC2_IN, and outputs the corresponding second calibration voltage $V_{DAC2}$. In this instance, the second calibration voltage $V_{DAC2}$ is 6 mV corresponding to 6 LSB, which is a remainder (α) value.

An input/output relationship is calculated therefrom as follows.

$$V_{OUT} = \qquad [\text{Formula 4}]$$
$$A \times (V_S - V_{DAC1}) - V_{DAC2} = 4 \times (-1.5\ mV + 0) + 6\ mV = 0$$

FIG. 6 is a diagram illustrating a touch signal that is amplified using gain greater than 1 and calibrated. As illustrated in FIG. 6, it can be seen that the quantization error amplified by the gain of the first calibration amplifier is eliminated, so that the calibration error is 0. Furthermore, in FIG. 3, the first calibration voltage corresponding to the first calibration code DAC1_IN is multiplied by the gain of the first calibration amplifier to move the sensing signal closer to the set reference line, and the second calibration voltage corresponding to the second calibration code DAC2_IN is subtracted from output of the first calibration amplifier to reduce the quantization error. Since the gain of the first calibration amplifier is greater than 1, it can be seen that a range of the quantization error calibrated by the first DAC 110 is larger than a range of the quantization error calibrated by the second DAC 210.

Figure 7:
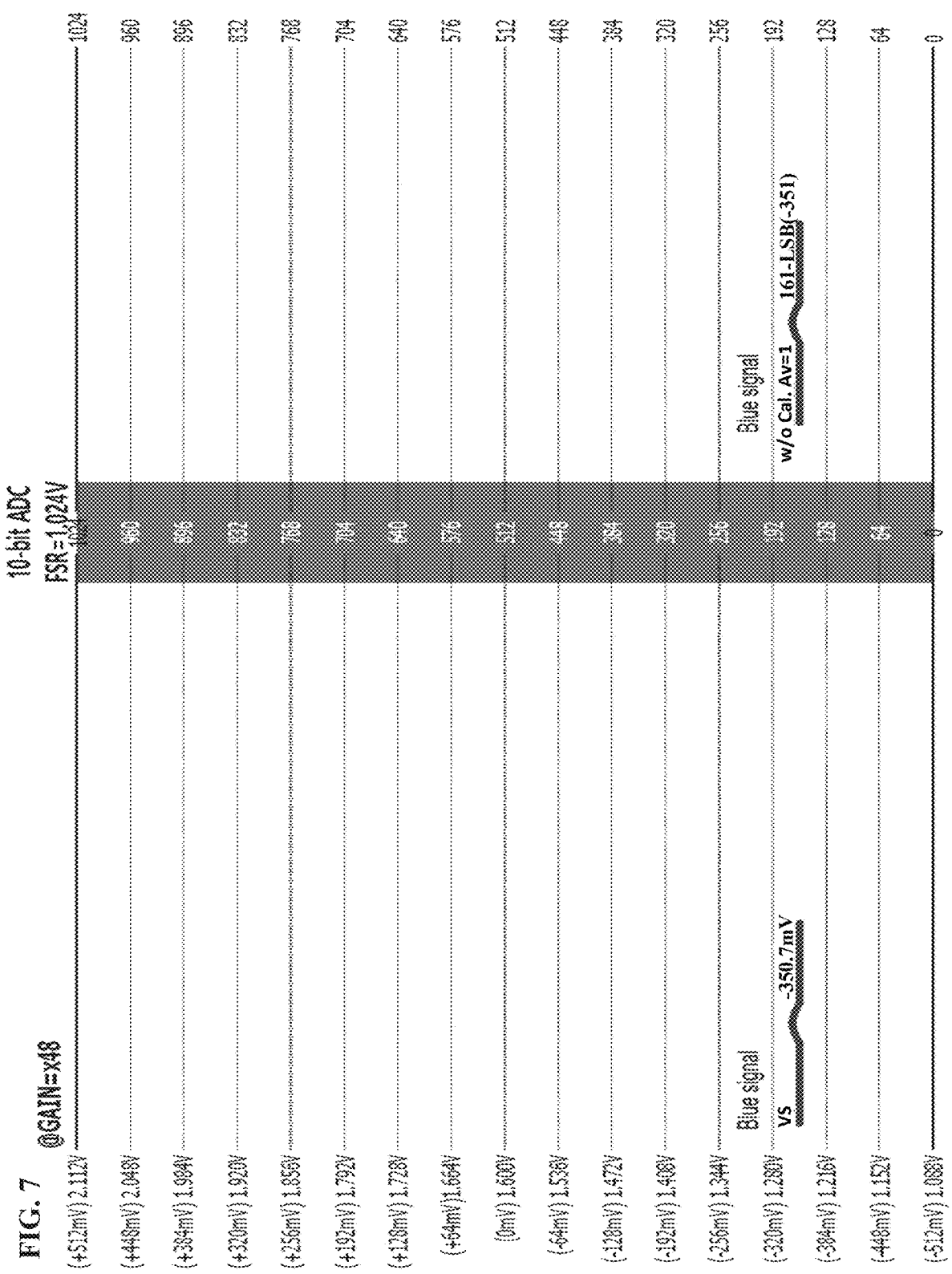
FIG. 7 is a diagram illustrating a touch signal and an unamplified sensing signal for first calibration as an example when the gain is 48.

Hereinafter, a second embodiment will be described with reference to FIGS. 7 to 9. In the second embodiment, the gain of the first calibration amplifier is 48. In the second embodiment, the touch signal $V_S$ swings based on −350.7 mV. When the gain A of the first calibration amplifier 110 is set to 1 for calibration and digitized, the touch signal $V_S$ swings based on a code 161.

In the illustrated state, an initial calibration code is calculated by calculating Formula 5 below. However, Signal of Formula 5 is a reference line at which the touch signal swings in a state where the touch signal $V_S$ is not calibrated and the gain is amplified to 1. A calculation result of Formula 5 corresponds to n=87 and α=3. The first calibration code DAC1_IN is formed from a quotient of the calculation result and provided to the first DAC 110, and the second calibration code DAC2_IN is formed from a remainder of the calculation result and provided to the second DAC 110.

$$\frac{Target - Signal}{A \times \left(\frac{Res_{ADC}}{Res_{DAC}}\right)} = \frac{512 - 161}{1 \times 2^2} = \frac{351}{4} = n + \frac{\alpha}{4} \quad \text{[Formula 5]}$$

Figure 8:
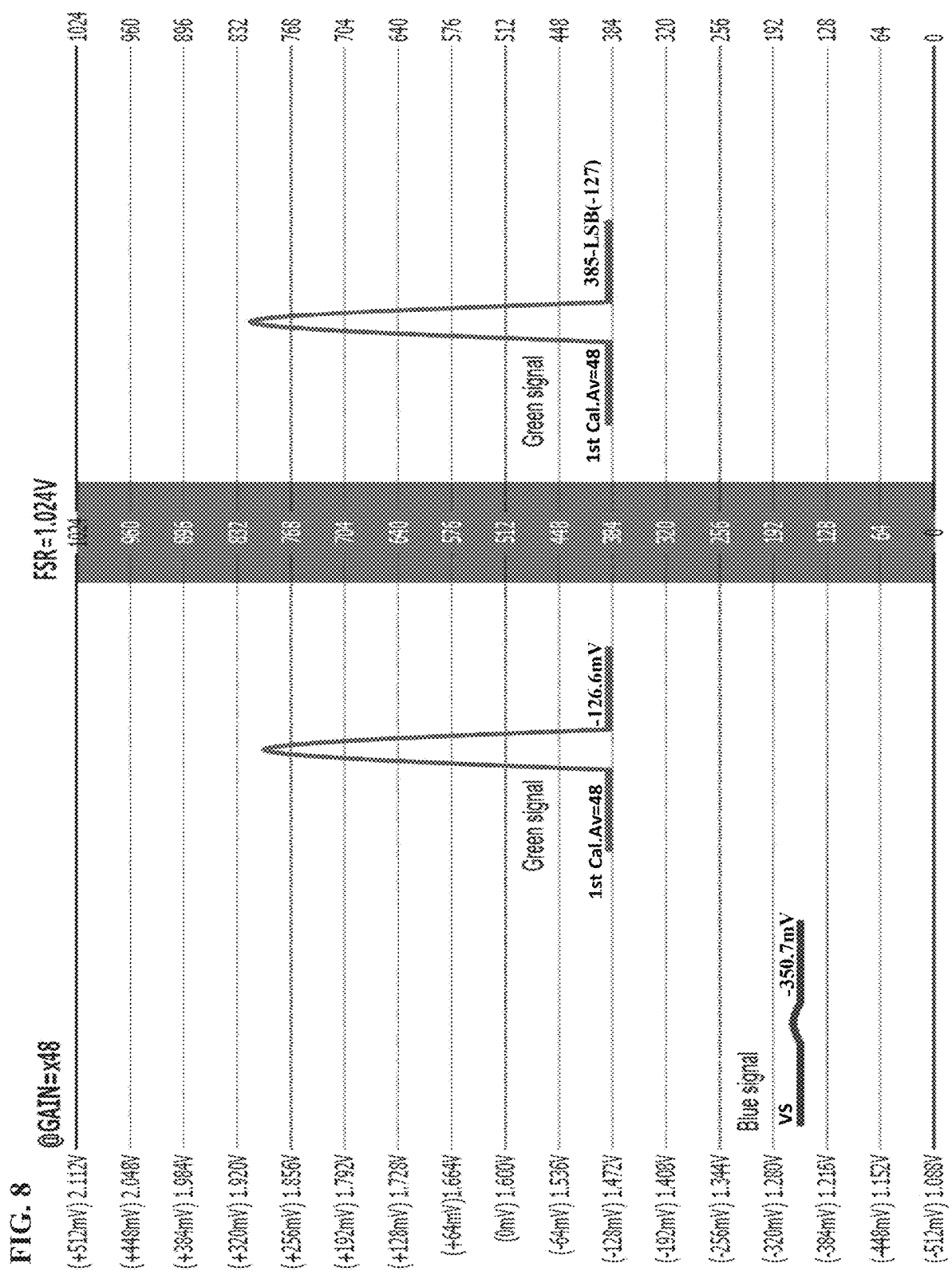
FIG. 8 is a diagram illustrating a green intermediate signal formed by providing a first calibration code calculated above for second calibration as an example when the gain is 48, together with a touch signal.

FIG. 8 is a diagram illustrating a green intermediate signal formed when the first calibration code DAC1_IN and the second calibration code DAC2_IN calculated as above are provided and the gain of the first calibration amplifier is set to 48, together with the touch signal $V_S$. Referring to FIG. 8, as described above, the operation unit 400 provides a quotient, 87 LSB, as the first calibration code DAC1_IN and a remainder, 3 LSB, as the second calibration code DAC2_IN. The first DAC 110 provided with the first calibration code DAC1_IN outputs the corresponding voltage value, 348 mV, as the first calibration voltage VDAC1, and the second DAC 210 provided with the second calibration code DAC2_IN outputs the corresponding voltage value, 3 mV, as the second calibration voltage VDAC2. In this instance, an output voltage $V_{OUT}$ is as shown in the following Formula 6.

$$V_{OUT} = A \times (V_S - V_{DAC1}) - V_{DAC2} = \quad \text{[Formula 6]}$$
$$48 \times (-350.7 \text{ mV} + 348 \text{ mV}) + 3 \text{ mV} = -126.6 \text{ mV}$$

An intermediate signal formed in this manner swings based on −126.6 mV, and when the intermediate signal is digitized, the intermediate signal swings based on a code 385. In this instance, for second calibration, the operation unit 400 calculates the first calibration code DAC1_IN and the second calibration code DAC2_IN by applying 48, which is the gain of the first calibration amplifier, as in Formula 7. As a result of calculation, a quotient becomes 0 and a remainder becomes 127. The operation unit 400 corrects the first calibration code using the calculated quotient and remainder. Since the first calibration code DAC1_IN for the first time is 87-LSB and the first calibration code DAC1_IN for the second time is 0-LSB, 87 LSB is provided as the final first calibration code DAC1_IN. Since the second calibration code DAC2_IN for the first time is 3 LSB and the second calibration code DAC2_IN for the second time is 127 LSB, 130 LSB is provided as the final second calibration code DAC2_IN.

$$\frac{Target - Signal}{A \times \left(\frac{Res_{ADC}}{Res_{DAC}}\right)} = \frac{512 - 385}{48 \times 2^2} = \frac{127}{192} = n + \frac{\alpha}{192} \quad \text{[Formula 7]}$$

Figure 9:
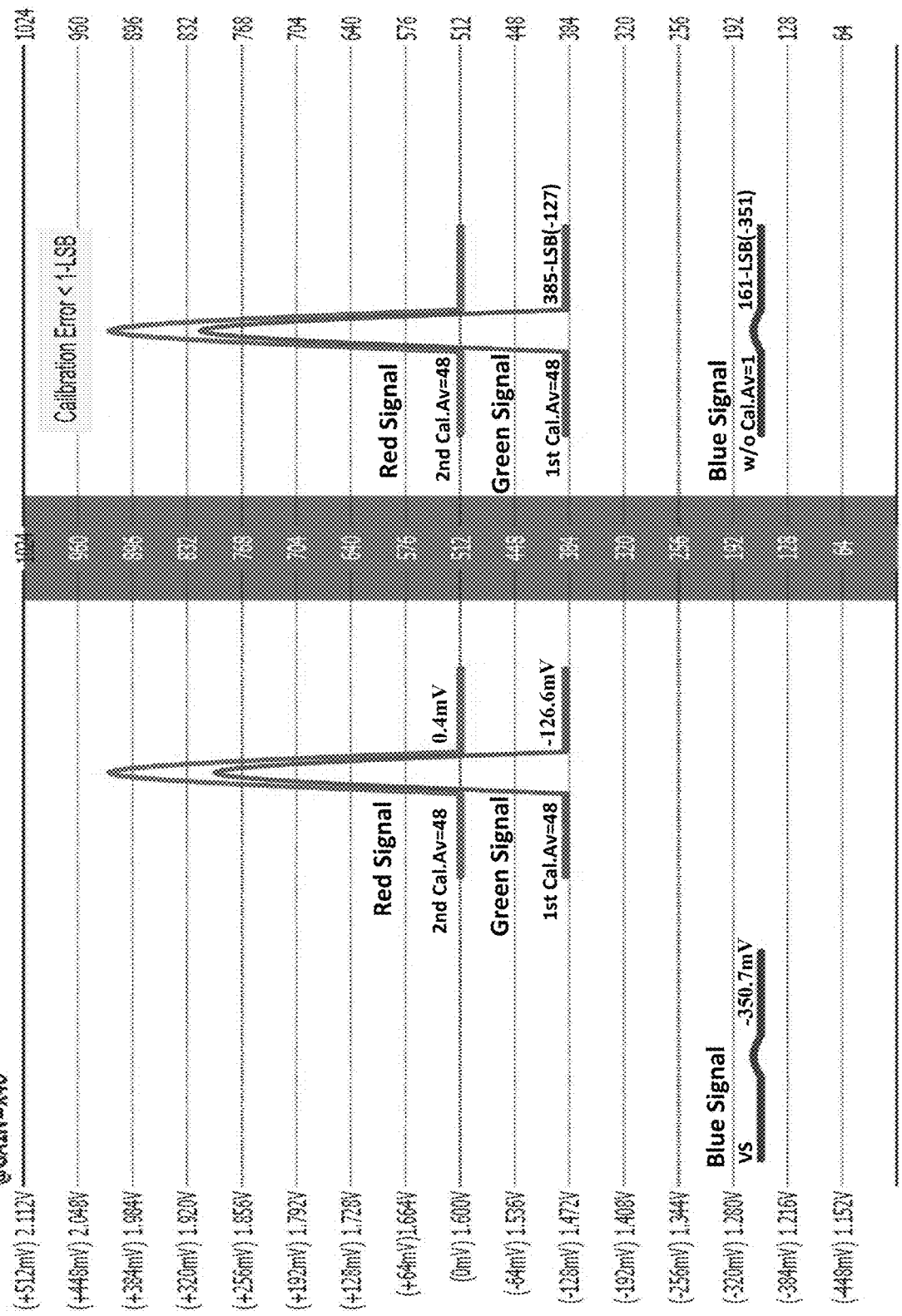
FIG. 9 is a diagram illustrating a finally calibrated signal according to the second calibration as an example when the gain is 48.

FIG. 9 is a diagram illustrating a signal calibrated according to final calibration described above. Referring to FIG. 9, the operation unit 400 outputs 87 LSB as the first calibration code DAC1_IN and 130 LSB as the second calibration code DAC2_IN. The first DAC 110 outputs 348 mV as the first calibration voltage $V_{DAC1}$, and the second DAC 210 outputs 130 mV as the second calibration voltage $V_{DAC2}$. An output signal of the touch signal detection apparatus is calculated therefrom as the following formula.

$$V_{OUT} = A \times (V_S - V_{DAC1}) - V_{DAC2} = \quad \text{[Formula 8]}$$
$$48 \times (-350.7 \text{ mV} + 348 \text{ mV}) + 130 \text{ mV} = 0.4 \text{ mV}$$

According to the present embodiment, even when DACs operating at lower resolution than that of ADCs are used, high calibration accuracy may be obtained as described later, and at the same time, the area consumption for forming the same is low, which is an advantage. In addition, the resolutions of the first DAC 110 and the second DAC 210 and the resolution of the ADC 300 are illustrative, and may be easily modified and implemented by those skilled in the art from the present embodiment.

As described above, the present embodiment provides an advantage in that the calibration error may be maintained at 1 LSB or less even when the gain of the calibration amplifier is greater than 1.

As described above, the present embodiment provides an advantage in that the calibration error may be maintained at less than 1 LSB even when the gain of the calibration amplifier is greater than 1.

The effects of the present invention are not limited to those mentioned above, and other tasks not mentioned herein may be clearly understood by those skilled in the art from the above description.

Even though the present invention has been described with respect to specific embodiments of the present invention, these are merely examples and the present invention is not limited thereto. Those skilled in the art to which the present invention pertains may change or modify the described embodiments without departing from the scope of the present invention, and various modifications and variations are possible within the scope of the technical idea of the present invention and the equivalent scope of the patent claims to be described below.

The invention claimed is:

1. A touch signal detection apparatus configured to calibrate a quantization error of a touch signal, the touch signal detection apparatus comprising:
   a first digital-to-analog converter (DAC) configured to provide a first calibration voltage;
   a first calibration amplifier configured to amplify and output a difference between a touch signal generated by detecting touch input and the first calibration voltage using gain greater than 1;
   a second DAC configured to provide a second calibration voltage;
   a second calibration amplifier configured to sample and hold a difference between output of the first calibration amplifier and the second calibration voltage; and
   an analog-to-digital converter (ADC) configured to convert output of the second calibration amplifier into a digital code,
   wherein bit resolutions of the first DAC and the second DAC are the same.

2. The touch signal detection apparatus according to claim 1, wherein an input/output relationship of the touch signal detection apparatus corresponds to a formula $V_{OUT} = A(V_S - V_{DAC1}) - V_{DAC2}$, where $V_{OUT}$ denotes a sensing signal, $V_S$ denotes a touch signal, $V_{DAC1}$ denotes a first calibration voltage, $V_{DAC2}$ denotes a second calibration voltage, and A denotes a first calibration amplifier.

3. The touch signal detection apparatus according to claim 1, further comprising an operation unit configured to provide a first calibration code corresponding to the first calibration voltage to the first DAC, and provide a second calibration code corresponding to the second calibration voltage to the second DAC.

4. The touch signal detection apparatus according to claim 3, wherein the operation unit of the touch signal detection apparatus provides, as the first calibration code, a quotient of a value obtained by dividing a difference between a target reference line and a reference line of a signal quantized without calibrating the touch signal by a product of a ratio of ADC bit resolution to the bit resolutions of the first DAC and the second DAC and gain of the first calibration amplifier, and provides a remainder of the divided value as the second calibration code.

5. The touch signal detection apparatus according to claim 3, wherein the operation unit of the touch signal detection apparatus calculates a formula $$\frac{\text{Target} - \text{Signal}_{w/o\_cal}}{A \times \left(\frac{Res_{ADC}}{Res_{DAC}}\right)} = n + \frac{\alpha}{A \times \left(\frac{Res_{ADC}}{Res_{DAC}}\right)},$$

and provides n and $\alpha$ as the first calibration code and the second calibration code, respectively, where Target denotes a target reference line, $\text{Signal}_{w/o\_cal}$ denotes a reference line of a signal quantized without calibrating the touch signal, A denotes gain of the first amplifier, $Res_{ADC}$ denotes bit resolution of the ADC, $Res_{DAC}$ denotes bit resolution of a DAC, n denotes a quotient, and $\alpha$ denotes a remainder.

6. The touch signal detection apparatus according to claim 3, wherein the operation unit of the touch signal detection apparatus provides, as the first calibration code, a quotient of a value obtained by dividing a difference between a target reference line and a reference line of a signal quantized by amplifying the touch signal using gain 1 by a ratio of bit resolution of the ADC to the bit resolutions of the first DAC and the second DAC, and provides a remainder of the divided value as the second calibration code.

7. The touch signal detection apparatus according to claim 6, wherein the operation unit provides, as the first calibration code, a quotient of a value obtained by dividing a difference between a target reference line for an intermediate signal formed by providing the first calibration code and the second calibration code and a reference line of the intermediate signal by a product of a ratio of the bit resolution of the ADC to the bit resolutions of the first DAC and the second DAC and gain of the first calibration amplifier to the first DAC, and provides a remainder of the divided value to the second DAC as the second calibration code.

8. The touch signal detection apparatus according to claim 3, wherein the operation unit of the touch signal detection apparatus calculates a formula $$\frac{\text{Target} - \text{Signal}}{1 \times \left(\frac{Res_{ADC}}{Res_{DAC}}\right)} = n + \frac{\alpha}{1 \times \left(\frac{Res_{ADC}}{Res_{DAC}}\right)},$$

and provides n and $\alpha$ as the first calibration code and the second calibration code, respectively, where Target denotes a target reference line, Signal denotes a reference line of a signal quantized by amplifying the touch signal using gain 1, $Res_{ADC}$ denotes bit resolution of an ADC, $Res_{DAC}$ denotes the bit resolutions of the first and second DACs, n denotes a quotient, and $\alpha$ denotes a remainder.

9. The touch signal detection apparatus according to claim 8, wherein the operation unit calculates a formula $$\frac{\text{Target} - \text{Signal}_m}{A \times \left(\frac{Res_{ADC}}{Res_{DAC}}\right)} = m + \frac{\beta}{A \times \left(\frac{Res_{ADC}}{Res_{DAC}}\right)},$$

and provides m and $\beta$ as a third calibration code of the first DAC and a fourth calibration code of the second DAC, respectively, where Target denotes a target reference line, $\text{Signal}_m$ denotes a reference line at which an intermediate signal swings, $Res_{ADC}$ denotes the bit resolution of the ADC, $Res_{DAC}$ denotes the bit resolutions of the first and second DACs, A denotes gain of the first amplifier, m denotes a quotient, and $\beta$ denotes a remainder.

10. The touch signal detection apparatus according to claim 1, wherein gain of the second calibration amplifier is 1.

11. The touch signal detection apparatus according to claim 1, wherein bit resolution of the ADC is greater than the bit resolution of the first DAC and the bit resolution of the second DAC.

* * * * *